Feb. 6, 1962     J. F. WARREN, JR     3,020,063
SAFETY TRAILER SUPPORT
Filed Sept. 30, 1959
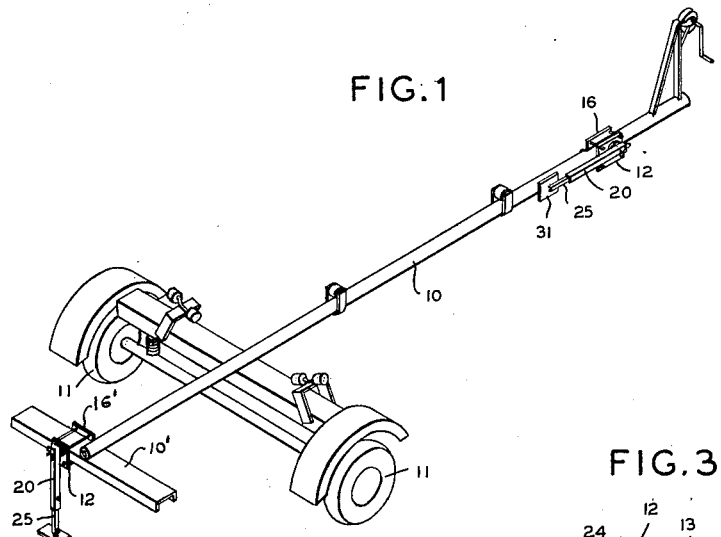
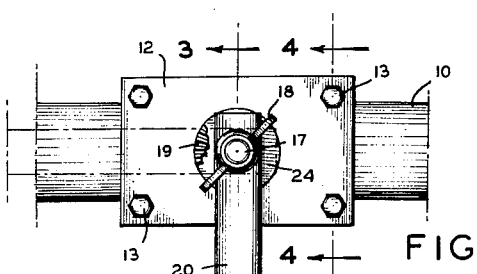
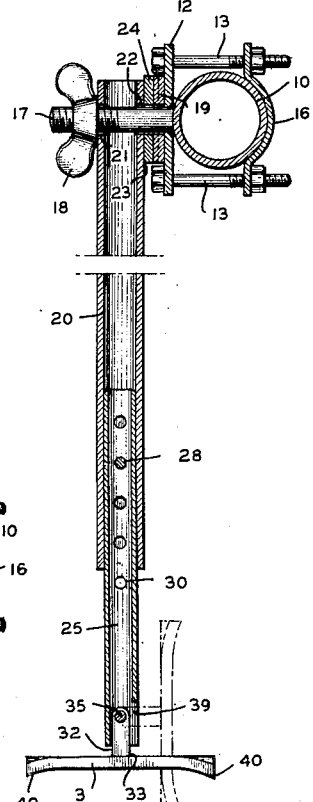
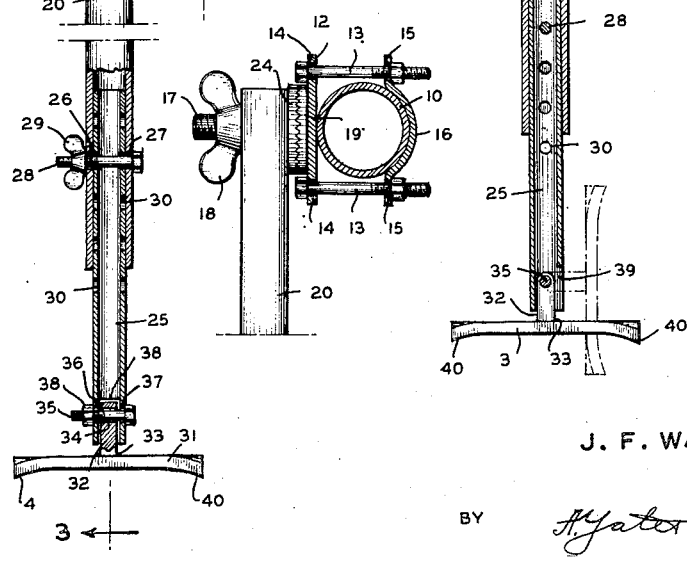
INVENTOR
J. F. WARREN, JR.
BY *H. Yater Dowell*
ATTORNEY United States Patent Office 3,020,063
Patented Feb. 6, 1962

3,020,063
SAFETY TRAILER SUPPORT
Jesse F. Warren, Jr., 1000 Hays St., Tallahassee, Fla.
Filed Sept. 30, 1959, Ser. No. 843,389
4 Claims. (Cl. 280—150.5)

This invention relates to the loading, transporting, unloading and storing of commodities and to the facilities and equipment by which the same is accomplished and especially to trailers which are supported intermediate their ends and have overhanging extremities.

The invention relates particularly to trailers used for transporting boats and the like, and to the supporting of the overhanging extremities of such trailers during the loading, unloading and storage thereof while they are not connected to towing vehicles.

In the loading and transporting of boats and the like by means of trailers it has been customary to support the trailers either loaded or unloaded, when not connected to towing vehicles, at the most convenient angle by means of any available objects which can be used as props or supports. This has been unsatisfactory and frequently the trailers have been so unstable that accidents have occurred resulting in serious injury and death to persons and damage to property, all of which has emphasized the importance both for safety and convenience that adequate means be provided for supporting both of the overhanging extremities of trailers.

It is an object of the invention to provide a simple inexpensive practical structure by which a boat or other light weight trailer may be supported in a stable and secure manner so that additional weight on any part will not upset it with consequent possible injury to persons and damage to property.

Another object of the invention is to provide safety trailer supporting means which can be readily and inexpensively applied to trailers including those in existence attached to the trailer and ready for use compactly carried as an integral part in a manner not to interfere with the use of the trailer and which is readily available for supporting the trailer at both ends regardless of whether the supporting surface is horizontal or inclined.

Other objects and advantages of the invention will be apparent from the following description taken in conjunction with the accompanying drawing in which:

FIG. 1 is a perspective of a boat trailer illustrating one application of the invention;

FIG. 2, an enlarged side elevation with parts broken away for clarity;

FIG. 3, a section on the line 3—3 of FIG. 2; and

FIG. 4, a section on the line 4—4 of FIG. 2.

Briefly stated, the safety trailer supporting means of the present invention comprises a support for attachment to the frame at each end of the trailer in a manner to form an integral part thereof and the presence of which will not constitute a liability or nuisance since it can be compactly folded to a position in which it is readily accessible and from which it readily can be moved to operative position and secured in such position with a minimum of effort and in a minimum of time, and from which it can be returned to inoperative position in like manner.

With continued reference to the drawings, the present invention is adapted to be applied to a boat trailer or other mobile unit having a frame or superstructure with a beam 10 and a cross member 10′ supported in any desired manner as for example by wheels 11 beneath the intermediate portion of the beam 10.

The present invention is intended to provide a positive means for supporting a trailer in a definite position by the application of a support at each end so that it will not be accidentally upset with likelihood of injury to children or other persons or property. The support is mounted by means of an attaching plate 12 mounted in a generally vertical plane by means of bolts and nuts 13, such bolts extending through openings 14 in the attaching plate 12 and through similar openings 15 in clamping yokes 16 and 16′ about the beam 10 and cross member 10′.

A threaded stud 17 is mounted at right angles to and centrally of the attaching plate 12 for the reception thereon of an internally threaded wing nut 18 and the attaching plate also is provided with a radially serrated hub portion 19 located concentrically of the threaded stud 17. On the threaded stud 17 is mounted a depending leg 20 having transverse openings 21 and 22 in which the threaded stud is received, such leg having attached thereto by welding 23 or in other desired manner a radially serrated disk 24 for cooperatively engaging the hub 19 in order that the leg 20 may be disposed either in substantially horizontal position parallel to the frame or in depending frame supporting position substantially at right angles to the frame but adjustable in accordance with the inclination of the surface on which the trailer is located.

Within the leg 20 is telescopically received a slightly smaller leg extension 25 in order that the leg length may be varied, the leg 20 being provided with openings 26 and 27 in which an externally threaded bolt 28 is received, a wing nut or other type of fastener 29 on the bolt serving to secure the latter in place. The leg extension 25 is provided with a series of openings 30 spaced along the length of the extension in one of which the bolt 28 is received. By inserting the bolt 28 through the desired openings the length of the leg can be varied until the leg is of the proper length to properly support the respective end of the trailer.

A base or foot 31 is provided for the lower end of the leg and is attached to the leg extension by means of an upstanding lug 32 secured by welding 33 or any other desired manner to the base 31, such lug having an opening 34 in which a bolt 35 is disposed, the bolt being received in openings 36 and 37 of the extension 25 and the bolt being held in place by a nut 38. The extension 25 is provided with a cutout portion 39 to permit the base or foot 31 to swing to a position generally parallel to the extension where it can be held when the leg is in inoperative horizontal position. The foot 31 may be of any desired configuration or may have its corners of a shape to provide earth engaging projections 40.

It will be apparent from the foregoing that a relatively simple and inexpensive structure is provided by means of which the extremities of a trailer may be securely and solidly supported against accidental upsetting as well as to provide a few parts ready to be applied and used with minimum consumption of time and effort and without interfering with the normal operation of the trailer.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. In combination with a load bearing vehicle supported intermediate its ends and including generally horizontal frame structure, that improvement which comprises supporting means for said ends, said supporting means including an attaching plate adapted to be located in a substantially vertical plane, an opposed clamping yoke between which and said plate a portion of said frame is received, bolts connecting said plate and said yoke in fixed relation to said frame, an externally threaded stud attached to and extending outwardly from said plate and forming a pivot, a hollow supporting leg on said pivot, a radially serrated hub fixed to said plates and located concentrically about the base of said stud, said leg having an opening about which there is fixed a radially serrated hub for cooperation with the first mentioned hub whereby said leg may be adjusted relative to said vehicle, a wing nut for engagement with the threads of said stud for binding said serrated hubs in fixed relation and said leg relative to said frame, a leg extension longitudinally telescoped within said leg, transverse openings through said leg and extension with a series of such openings in one whereby said extension may be relatively adjusted to vary the length, a transverse pin for securing said leg and extension in adjusted position one relative to the other, and a pivoted foot on the outer end of said extension and movable from a transverse position to a position substantially parallel to said leg.

2. In combination with a load bearing vehicle supported intermediate its ends and including generally horizontal frame structure, that improvement which comprises supporting means for said ends, said supporting means including an attaching plate located in a substantially vertical plane, an opposed clamping yoke between which and said plate a portion of said frame is received, bolts connecting said plate and said yoke in fixed relation to said frame, an externally threaded stud attached to and extending outwardly from said plate and forming a pivot, an adjustable length supporting leg on said pivot, a radially serrated hub fixed to said plate and located concentrically about the base of said stud, said leg having an opening with a radially serrated hub secured thereabout for cooperation with the first mentioned hub whereby said leg may be adjusted relative to said vehicle, a wing nut for engagement with the threads of said stud for binding said serrated hubs in fixed relation and said leg relative to said frame.

3. In combination with a load bearing vehicle supported intermediate its ends and including generally horizontal frame structure, that improvement which comprises supporting means for said ends, said supporting means including an attaching member, an opposed clamping member between which and said attaching member a portion of said frame is received, bolts connecting said attaching and clamping members in fixed relation to said frame, an externally threaded stud attached to and extending outwardly from said plate and forming a pivot, a supporting hollow leg on said pivot, a radially serrated hub fixed to said plate and located concentrically about the base of said stud, an opening in the said leg with a radially serrated hub secured thereabout for cooperation with the first mentioned hub whereby said leg may be adjusted relative to said vehicle, a wing nut for engagement with the threads of said stud for binding said serrated hubs in fixed relation and said leg relative to said frame.

4. The combination of a trailer including frame structure and a foldable safety support for attachment to said frame structure at the ends of the trailer in a manner to form an integral part thereof and to be capable of being readily moved between operative and inoperative positions, said safety support including an attaching plate adapted to be disposed in a substantially vertical plane on one side of said frame structure, an opposed clamping yoke between which and said plate a portion of the frame structure is adapted to be located, bolts connecting said plate and yoke and binding the same to said frame structure, an externally threaded stud forming a pivot attached to and extending from said plate in the opposite direction from said yoke, a radially serrated hub fixed to said plate concentrically about the base of said stud, an extensible supporting leg mounted on said pivot, said leg having an opening in which said stud is received and a radially serrated hub fixed thereabout for cooperation with the first hub whereby said leg may be adjusted relative to said stud and to the frame on which said stud is mounted, a wing nut for engagement with the threads of said stud for tightening said serrated hubs in fixed relation to each other and said leg in fixed relation to said frame, said extensible leg including overlapping members and a bolt and wing nut for binding them in fixed adjusted relation, and a pivoted foot on the lower end of said leg movable from a transverse operative position to an inoperative position substantially parallel to said leg.

References Cited in the file of this patent

UNITED STATES PATENTS

| | | |
|---|---|---|
| 1,849,303 | Labaw | Mar. 15, 1932 |
| 1,885,384 | Snow | Nov. 1, 1932 |
| 2,162,181 | Skinner | June 13, 1939 |
| 2,335,946 | Klaus | Dec. 7, 1943 |
| 2,471,184 | Andrews | May 24, 1949 |
| 2,503,199 | Goldblatt et al. | Apr. 4, 1950 |
| 2,519,364 | Fredholm | Aug. 22, 1950 |
| 2,571,390 | Strand | Oct. 16, 1951 |

FOREIGN PATENTS

| | | |
|---|---|---|
| 204 857 | Australia | Dec. 14, 1956 |